United States Patent [19]

Pawlak et al.

[11] Patent Number: 5,023,546

[45] **Date of Patent: * Jun. 11, 1991**

[54] VARIABLE RELUCTANCE ROTATION SENSOR WITH CHANGING COIL LINKAGES AND A PAIR OF FLUX PRODUCING MAGNETS

[75] Inventors: Andrzej M. Pawlak, Troy, Mich.; Takeshi Shirai, Anderson, Ind.

[73] Assignee: General Motors Corporation, Detroit, Mich.

[ * ] Notice: The portion of the term of this patent subsequent to Jun. 11, 2008 has been disclaimed.

[21] Appl. No.: 433,306

[22] Filed: Nov. 8, 1989

[51] Int. Cl.$^{5}$ ...................... G01P 3/488; H02K 21/38

[52] U.S. Cl. ................................ 324/174; 188/181 R; 310/155; 310/168; 324/207.15

[58] Field of Search ........... 324/163, 173, 174, 207.15, 324/207.25; 310/154, 155, 168, 49 R, 170, 171, 181, 186, 269; 188/181 R

[56] References Cited

U.S. PATENT DOCUMENTS

| | | | |
|---|---|---|---|
| 2,304,866 | 12/1942 | Wall | 310/155 |
| 3,469,662 | 9/1969 | Dewar | 324/174 X |
| 3,947,711 | 3/1976 | Presley et al. | 310/155 |
| 3,961,214 | 6/1976 | Lokkart | 324/174 X |
| 4,687,961 | 8/1987 | Horber | 310/186 |
| 4,713,570 | 12/1987 | Mastromattei | 310/168 |
| 4,772,815 | 9/1988 | Harned et al. | 310/186 |

FOREIGN PATENT DOCUMENTS

| | | | |
|---|---|---|---|
| 2811746 | 10/1978 | Fed. Rep. of Germany | 324/174 |
| 584249 | 12/1977 | U.S.S.R. | 324/174 |
| 364877 | 1/1932 | United Kingdom | 310/269 |

*Primary Examiner*—Gerard R. Strecker

*Attorney, Agent, or Firm*—Robert M. Sigler

[57] ABSTRACT

A variable reluctance rotation sensor comprises a rotatable magnetic toothed wheel adjacent a fixed magnetic pickup assembly. The pickup assembly comprises a pair of permanent magnets, each with a similar pole adjacent the wheel and separated circumferentially by the arc between a tooth and a non-adjacent slot. A magnetic flux member with a coil joins the other poles of the magnets in series opposed relationship and extends in close proximity to the tooth wheel to establish separate flux loops for each magnet distributed along the coil. The flux loops are spatially determined by the teeth and slots between the permanent magnets, so that they fluctuate circumferentially and generate an electrical signal in the coil with wheel rotation by variation of the flux linkages to individual turns of the coil. The sensor thus uses spatial flux changes to produce a rotation signal at very low rotational speeds with a larger air gap than that of conventional sensors.

2 Claims, 2 Drawing Sheets

56 52 32 41 31 30 20 15 50 33 57 53 60 61 S N 25 35 40 S N 36 11 12 26 11 12 10

VARIABLE RELUCTANCE ROTATION SENSOR WITH CHANGING COIL LINKAGES AND A PAIR OF FLUX PRODUCING MAGNETS

BACKGROUND OF THE INVENTION

This invention relates to a variable reluctance rotation sensor which generates a high output signal at very low rotational speeds. Such a sensor would find particular utility in an vehicle anti-lock braking or traction control, in which low rotational speed sensing is required.

A variable reluctance rotation sensor of the prior art may typically comprise a rotatable toothed magnetic wheel and a stationary sensor unit having a permanent magnet and apparatus establishing a main flux loop including the permanent magnet and toothed wheel and defining an air gap between a member of the sensor unit and the closest tooth or teeth of the wheel. The member defining the air gap may be a magnetic flux member or the permanent magnet itself. The air gap thus varies with rotation of the toothed wheel between a small gap when the member is aligned with a tooth and a larger gap when it is not. The main flux loop is linked to all the turns of an electrical coil surrounding the magnetic flux member; and an electric voltage is generated in the coil proportional to the rate of change of the flux linked thereto. As the toothed wheel rotates, the total flux in the main flux loop linked to the coil changes with the changing air gap, as teeth and inter-teeth slots alternately pass the stationary sensor unit; and an output electrical signal is generated in a sinusoidal pattern, with a maximum each time the member is aligned with a tooth and a minimum each time it is aligned with a slot.

The amplitude of the signal in a variable reluctance rotation sensor of the prior art varies with such well known design factors as the energy product of the permanent magnet and the minimum air gap size; and good design in the prior art has tended to provide the greatest magnetic energy from a magnet of a given size, the smallest consistently producible minimum air gap and the greatest possible concentration of main flux through the tooth adjacent the magnet or flux member. Although leakage flux, which escapes the main flux path, is inescapable, the design tendency has been to minimize it for the greatest possible percentage of total magnetic flux in the main flux loop linked to the entire coil. The recent use of new high energy product magnetic materials has helped provide a high level of magnetic flux from a small magnet in a limited space. However, it is difficult to hold a tight minimum air gap consistently in mass production at reasonable cost. Also, the amplitude of the sensor signal decreases with rotational speed, since the rate of change of flux due to air gap variation decreases as the tooth moves more slowly past the stationary member. Therefore, inexpensive variable reluctance rotation sensors generating a high output at very low rotational speeds are not readily available.

In a vehicle anti-lock brake system, the sinusoidal output of a variable reluctance rotation sensor is filtered with a noise suppressing dead band. A rotation is counted only if the sinusoidal peak of the signal exceeds the deadband, with any signal event within the deadband not accompanied by travel out of the deadband being considered noise and ignored. The greater the peak-to-peak signal level, the greater the deadband can be established and the greater is noise immunity. However, as rotational speed falls close to zero RPM, the output of most available rotation sensors falls to very low levels which can limit the usable deadband and thus reduce noise immunity. This makes it more difficult to use such sensors in anti-lock braking systems.

SUMMARY OF THE INVENTION

The variable reluctance rotation sensor of this invention generates a higher output at very low rotational speeds than those of the prior art and therefore provides an improved rotational speed signal for use in vehicle anti-lock braking and traction control systems. In addition, the sensor of this invention provides such a signal with a larger minimum air gap than typical variable reluctance sensors of the prior art. Whereas variable reluctance sensors of the prior art are designed to sense variations in the total flux level in the main flux loop linked to the entire electrical coil, the variable reluctance sensor of this invention relies more on changes in spatial flux distribution to vary the linkages of flux to individual coil turns. It accomplishes this by establishing substantial flux loops, normally considered leakage flux, which are separate for each magnet and which include return paths crossing the air gap from the flux member to the toothed wheel between the magnets so as to be linked to a variable number of the total turns of the electrical coil wrapped around the flux member. We have discovered that this approach produces a significantly more sensitive sensor with a higher output than can be obtained from the traditional prior art apparatus, especially at low rotational speeds and with a larger minimum air gap.

In our copending patent application U.S. Ser. No. 07/433,000, filed Nov. 8, 1989 and assigned to the assignee of this application, we disclose a variable reluctance sensor using a pair of permanent magnets, each mounted adjacent the toothed wheel and having opposite poles facing the teeth. The magnets of that sensor are spaced circumferentially so as to be simultaneously aligned with teeth or slots as the wheel turns. A flux member joins the other poles of the magnets in series aiding relationship to create a common main flux path through both magnets and the toothed wheel; but the flux member extends adjacent the toothed wheel to provide significant additional flux loops for each magnet which cross the air gap between the flux member and wheel between the magnets and enclose only some of the turns of an electrical coil surrounding the flux member. These additional flux loops are affected by passing alternating teeth and slots between the magnets to fluctuate circumferentially and thus vary the flux linkages to individual turns of the coil. The result is a greater output signal over that obtained from main air gap variation in the common flux loop alone, as in standard prior art sensors.

However, we have discovered that the sensor of the invention disclosed herein, which is also based on changing flux distribution rather than on changing of flux level in the main flux loop, is superior even to the sensor of the previously identified application, although this is not predicted by conventional theory based only on main air gap variation of total flux levels. The sensor of this invention uses a similar arrangement of two magnets and a flux member extending adjacent the toothed wheel to provide flux loops enclosing only some of the coil turns; but there are two differences: (1) the magnets have poles oriented in series opposing relationship— that is, with similar rather than opposite poles adjacent the toothed wheel—and (2) the magnets are spaced circumferentially so that, when one is aligned with a tooth of the wheel, the other is aligned with a non-adjacent slot. The first of these differences determines that there is no common main flux loop including both magnets. Rather, each magnet sets up its own flux loops; and the majority of flux is distributed across the air gap between the magnets to enclose only part of the coil. Thus, the additional flux paths of the previously identified application are increased in the apparatus of this invention, wherein they are the main flux paths. The second of these differences determines that the contributions of the variations in flux from the two magnets will vary periodically in opposite phase with the passage of teeth and will therefore be additive across the coil.

The invention is a variable reluctance rotation sensor comprising a magnetic toothed wheel having teeth evenly spaced by slots around the periphery thereof and being rotatably supported with respect to a fixed magnetic pickup assembly. The pickup assembly comprises a pair of permanent magnets each having a pair of poles with a similar one of its pair of poles adjacent the toothed wheel: that is, both magnets have north poles, for example, adjacent the wheel. The permanent magnets are separated from each other circumferentially around the periphery of the toothed wheel by an arc equal to the arc between one of the teeth and a non-adjacent slot, whereby the first and second permanent magnets are alternately and opposingly aligned with teeth and slots as the toothed wheel rotates.

The magnetic pickup assembly further comprises a magnetic flux member with a multi-turn electrical coil wound thereon, the flux member joining the other of the poles of the first and second permanent magnets in series opposed relationship and extending between the permanent magnets in close proximity to the toothed wheel to establish separate, oppositely directed flux loops for each of the permanent magnets distributed along the magnetic flux member. The flux loops are variably spatially determined by the position of teeth and slots adjacent the magnetic flux member between the permanent magnets and thus fluctuate circumferentially across the coil with passing alternating teeth and slots as the wheel rotates to generate an electrical signal in the electrical coil by variation of flux linkages to individual coil turns with wheel rotation.

In the sensor of this invention, the changes in flux spatial distribution due to the passing teeth and slots in the region between the magnets, with consequent changes in flux linkages to individual coil turns, appear to greatly increase the rate of change in flux at low rotational speeds over that which would be produced by the change in total flux at the air gap of a main flux loop. The invention thus provides an advantage over the prior art in maximizing the utilization of additional flux loops normally considered leakage flux to be minimized in prior art sensors.

The variation in flux linkages to individual coil turns is made possible by the use of two permanent magnets, each of which has separate north and south poles and can thus support separate flux loops, and by the proximity of the magnetic flux member to the toothed wheel, which helps establish significant flux loops cutting across the coil between the magnets. The amount of flux affected is maximized by arranging the magnets in series opposed relationship to eliminate a common main flux loop, create an opposing and therefore additive phase relationship between the flux loops of the two magnets, and ensure that a majority of flux loops are distributed along the coil linked to a variable number of coil turns. Although not required for all embodiments of this invention, a preferred embodiment places the magnets sufficiently far apart that there are always several teeth of the wheel between the magnets. These teeth are in close proximity to the flux member and help concentrate the flux loops for circumferential fluctuation with wheel rotation. Further details and advantages of this invention will be apparent from the accompanying drawings and following description of a preferred embodiment.

DESCRIPTION OF THE PREFERRED EMBODIMENT

Figure 1:
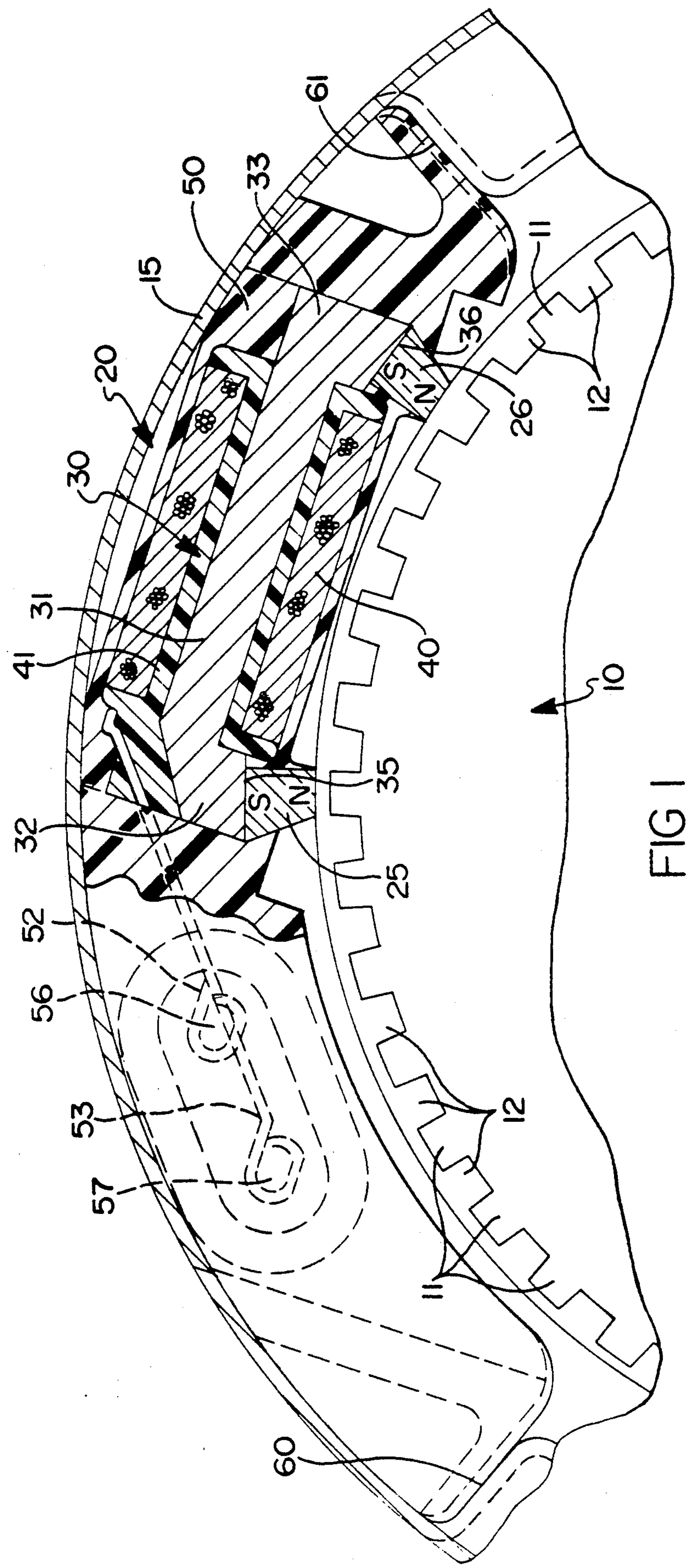
FIG. 1 shows, partly in section, a variable reluctance rotational speed sensor according to this invention.

Referring to FIG. 1, a toothed wheel 10 is rotatably mounted in, for example, the wheel housing of a vehicle equipped with an anti-lock braking system. Magnetic toothed wheel 10 is engaged for rotation with one of the vehicle road wheels, the rotational speed of which is required. Toothed wheel 10 comprises, at its outer peripheral edge, a plurality of rectangular teeth 11 separated by slots 12. Teeth 11 are evenly spaced by slots 12 around the periphery or circumference of wheel 10 and are substantially identical in size and shape. Such toothed wheels are themselves well known in rotational speed sensing equipment.

Toothed wheel 10 is enclosed within a cover 15, which also encloses a sensor unit 20. Cover 15 may be, although not necessarily, a grease cover for a wheel bearing unit. Sensor unit 20 is molded in a thermoplastic housing press fit into a suitably formed recess in cover 15; although it could be welded or otherwise attached to the wheel cover by means of mounting brackets extending out of the molded housing 50, if desired. In either case, sensor unit 20 is fixed in a stationary position adjacent teeth 11 of wheel 10 so that teeth 11 and slots 12 of wheel 10 alternately pass sensor unit 20 as wheel 10 rotates.

Sensor unit 20 comprises a pair of permanent magnets 25 and 26 adjacent wheel 10, each of magnets 25 and 26 having a north pole and a south pole at opposite ends thereof. Magnets 25 and 26 are shown as trapezoidal in shape. This provides assembly advantages, in that the shape contributes to their being more easily held in the thermoplastic housing 50. However, this is obtained at the cost of more magnet mass and material than a rectangular magnet of equivalent energy product. Permanent magnets 25 and 26 are oriented with their poles radially aligned with wheel 10, so that similar poles of each of magnets 25 and 26 form air gaps with alternating teeth 11 and slots 12 of wheel 10 as the latter rotates.

For example, in this embodiment, both magnets 25 and 26 have north poles adjacent wheel 10. Magnets 25 and 26 are spaced circumferentially around the periphery of wheel 10 by an arc equal to that between a tooth and a non-adjacent slot, so that, when one of magnets 25 and 26 is adjacent a tooth of wheel 10, the other is adjacent a slot with at least one other tooth between the magnets. In the preferred embodiment shown, there will be several teeth between the magnets, as seen with teeth 11*b*, 11*c* and 11*d* in FIG. 2; and these teeth, as will be describe at a later point, will concentrate the flux of the return paths and thus help cause the flux loops to fluctuate circumferentially as wheel 10 rotates.

Sensor unit 20 further comprises a magnetic flux member 30, which comprises a long straight portion 31 with short pole portions 32 and 33 perpendicular to straight portion 31 at the two ends thereof. Pole portion 32 has a slanted end surface 35 to which the south pole of permanent magnet 25 is affixed, the slant of the surface providing the required radial orientation of magnet 25 relative to wheel 10. Similarly, pole portion 33 has a slanted end surface 36 to which the south pole of magnet 26 is affixed to provide the required radial orientation of magnet 26 relative to wheel 10. Straight portion 31 of flux member 30 extends adjacent wheel 10 between magnets 25 and 26. Straight portion 31 does not have to be perfectly straight, as long as it extends close to wheel 10 between the magnets 25 and 26. However, a straight portion seems to work well, due to the fact that the curvature of the wheel brings it closer to straight portion 31 near the center of the latter; and it is easy to manufacture.

Figure 2:
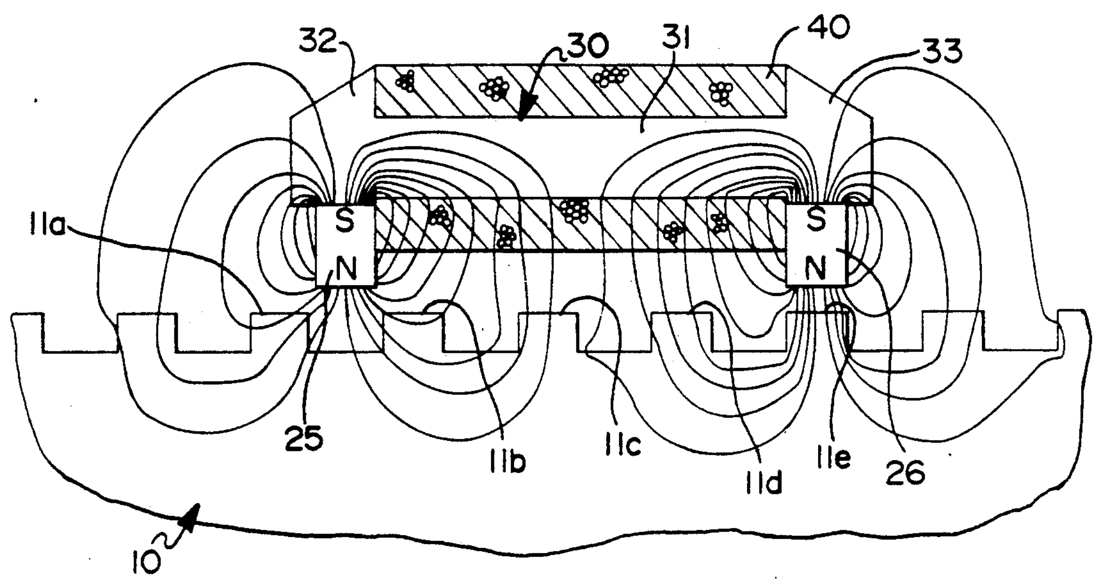
FIG. 2 shows a schematic view of a sensor according to this invention, including magnetic flux lines to demonstrate the total flux pattern.

Magnetic flux member 30 is made of a magnetic material such as steel. The arrangement of the poles of magnets 25 and 26 is in series opposing relationship. Thus, no common main magnetic flux loop is established through both magnets. Rather, each of magnets 25 and 26 establishes its own separate flux loops, as shown in FIG. 2. For each magnet, a large percentage of the flux is contained in loops which can be traced from the south pole of the magnet through part of the straight portion 31 of flux member 30, across a large air gap to wheel 10, and back through wheel 10 and a smaller air gap to the north pole of the magnet. Since there is a large air gap in the return path of each of these flux loops, one expects that the total flux levels will be lower than would be the case if a single flux path were established through both magnets and the total length of flux member 30 by series aiding magnets. However, comparing the same two arrangements, that of this invention will provide the greater flux in loops having return paths leaving flux member 30 and cutting across to wheel 10 between the magnets and thus the most flux available for spatially distributional changes as wheel 10 rotates.

Figure 3:
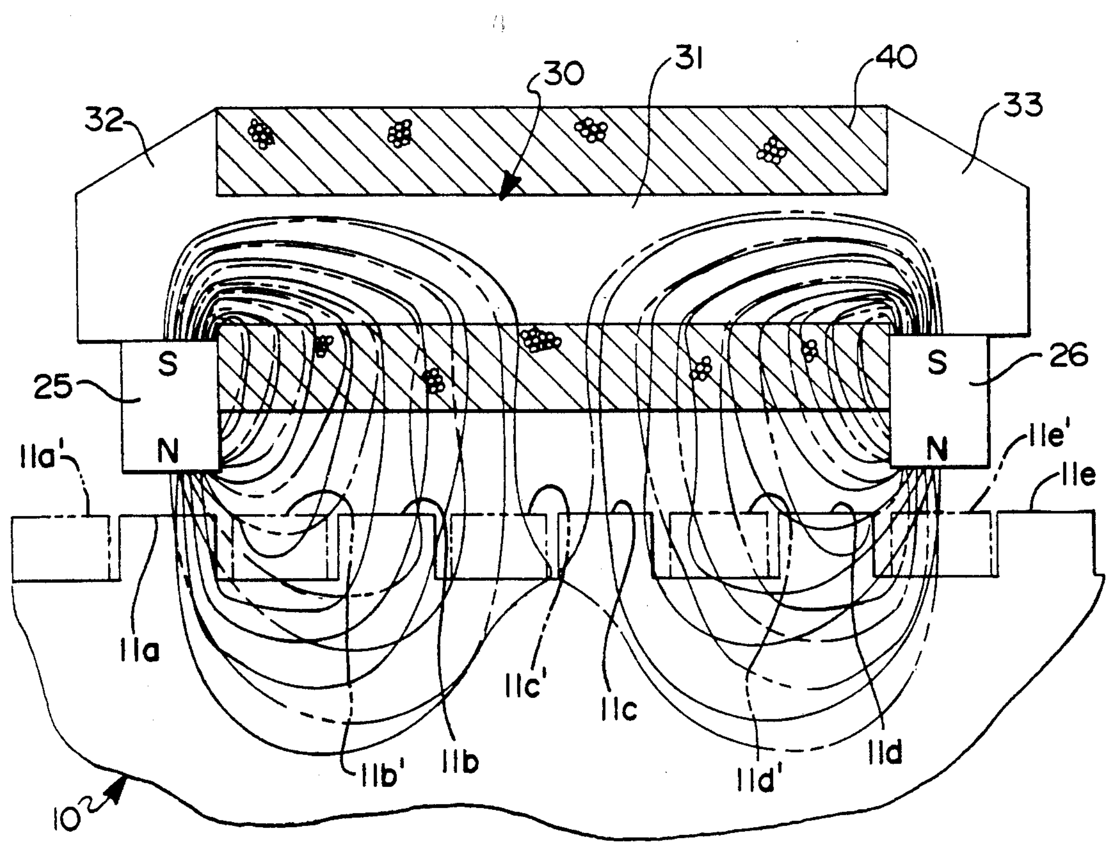
FIG. 3 shows an enlarged schematic view of a sensor according to this invention, including magnetic flux loops having return paths cutting across the coil between the magnets, with the solid flux lines showing the flux pattern when one of the magnets is adjacent a tooth and the broken lines showing the flux pattern when the other of the magnets is adjacent a tooth.

FIG. 3 show the flux changes in the sensor of this embodiment as wheel 10 rotates to the left in the Figures from a first position, shown in solid lines, in which magnet 25 is aligned with tooth 11*a* and magnet 26 is aligned with the slot between teeth 11*d* and 11*e*, and a second position, shown in broken lines, in which magnet 26 is aligned with tooth 11*e'* and magnet 25 is aligned with the slot between teeth 11*a'* and 11*b'*. FIGS. 2 and 3 are reproduced from a computer simulation of the flux and are thus drawn with in a straight linear arrangement; however, the flux lines would not be significantly different with the curvature of wheel 10. FIG. 3 shows a shift in flux to the left in the sideways or circumferential direction from the positions shown by the solid flux lines to those shown by the broken flux lines as the wheel moves between the two positions, due to the flux concentrating influence of the moving tooth. When the wheel moves a similar distance again, the flux will shift back to the right to the positions shown by the solid flux lines as the next tooth follows. Thus, rotation of wheel 10 produces circumferential fluctuation of the flux loops in the region between the magnets.

A coil 40 of insulated, electrically conducting wire is wound on a spool 41 around flux member 30. Coil 40 extends over substantially the entire length of flux member 30 so as to be crossed by the maximum flux loops between the magnets. With the flux distributed circumferentially across coil 40 and fluctuating circumferentially as wheel 10 rotates, the flux linkages of coil 40 are varied to generate a sinusoidal voltage therein. The peak amplitude of this voltage is substantially higher, for a similar minimum air gap size, than that which would be produced by a main air gap variation in total flux of the two magnets separately or in a common flux loop including both permanent magnets. The output signal of coil 40 is generated across output leads 52 and 53 connected to opposite leads of the coil.

The stationary elements within sensor unit 20, such as magnets 25 and 26, flux member 30 and coil 40 are molded in thermoplastic housing 50, which is retained in a recess between walls 60 and 61 within cover 15. Alternatively, housing 50 could further include molded-in brackets which could be welded to cover 15. The current from coil 40 is provided to the outside environment through a pair of leads 52 and 53 connected to opposite ends of the coil within housing 50 and having portions projecting out of housing 50 for electrical contact with terminals 56 and 57, respectively, which provide the signal outside cover 15. The circumferentially extended arrangement of stationary sensor unit 20, although it follows directly from the requirements of providing the desired leakage flux paths, has the additional advantage of fitting well into the limited space available within cover 15.

It is contemplated that magnets 25 and 26, which may be made from such high magnetic energy product materials as rare earth neodymium or samarium cobalt. are to be magnetized in place after assembly using a magnetizer having a forked pole piece with each fork against the radially inner surface of one of the magnets and a single return pole piece extending adjacent flux member 30. The current level of the magnetizer may be adjusted in response to an output signal from the coil in closed loop control to produce the proper magnetizing level.

The embodiments of the invention in which an exclusive property or privilege is claimed are defined as follows:

1. A variable reluctance rotation sensor comprising a magnetic toothed wheel having teeth evenly spaced by slots around the periphery thereof and being rotatably supported with respect to a fixed magnetic pickup assembly comprising, in combination;

a pair of permanent magnets each having a pair of poles with a similar one of its pair of poles adjacent the toothed wheel, the permanent magnets being separated from each other circumferentially around the periphery of the toothed wheel by an arc equal to the arc between one of the teeth and a non-adjacent slot, whereby the first and second permanent magnets are alternately and opposingly aligned with teeth and slots as the toothed wheel rotates; and a magnetic flux member with a multi-turn electrical coil wound thereon, the flux member joining the other of the poles of the first and second permanent magnets in series opposed relationship and extending between the permanent magnets in close proximity to the toothed wheel to hold the coil tangentially in close proximity thereto without additional flux concentrating poles so as to establish separate, oppositely directed flux loops for each of the permanent magnets with return paths established through the coil between ones of the teeth between the permanent magnets and portions of the magnetic flux member adjacent the ones of the teeth so as to be distributed circumferentially across the coil, the flux loops being variably spatially determined by the position of teeth and slots in proximity to the magnetic flux member between the permanent magnets and thus fluctuating circumferentially across the coil with passing alternating teeth and slots as the wheel rotates to generate an electrical signal in the electrical coil by variation of the flux linkages to individual coil turns with wheel rotation.

2. The variable reluctance rotation sensor of claim 1 in which the arc between the permanent magnets is sufficient that there are always a plurality of teeth of the toothed wheel therebetween, whereby flux loops are established with return paths through each of the plurality of teeth.

* * * * *